United States Patent [19]

Keyes

[11] 4,163,914
[45] Aug. 7, 1979

[54] INFINITELY VARIABLE RATIO PERMANENT MAGNET TRANSMISSION

[76] Inventor: John H. Keyes, P.O. Box 474, Nederland, Colo. 80466

[21] Appl. No.: 786,545

[22] Filed: Apr. 11, 1977

[51] Int. Cl.² .......................................... H02K 7/114
[52] U.S. Cl. .................................. 310/103; 310/105; 180/70 R
[58] Field of Search ............... 310/103, 105, 104, 102, 310/92, 93, 74, 96, 100; 180/70 R

[56] References Cited

U.S. PATENT DOCUMENTS

| | | | |
|---|---|---|---|
| 1,259,861 | 3/1918 | Henry | 310/105 |
| 1,333,415 | 3/1920 | Henry | 310/103 |
| 1,962,659 | 6/1934 | Kautz | 310/103 |
| 2,437,871 | 3/1948 | Wood | 310/103 |
| 2,548,731 | 4/1951 | Lehde | 310/93 X |
| 2,680,203 | 6/1954 | Zozulin et al. | 310/105 X |
| 2,873,394 | 2/1959 | Zozulin | 310/96 X |
| 3,256,823 | 6/1966 | Keyes | 310/105 X |
| 3,579,003 | 5/1971 | Gray | 310/93 |
| 3,858,674 | 1/1975 | Tabor | 310/74 X |

OTHER PUBLICATIONS

"Magnetic Drives", Indiana General, 3/70.

*Primary Examiner*—Donovan F. Duggan
*Attorney, Agent, or Firm*—Gary M. Polumbus

[57] ABSTRACT

Magnetic flux from a plurality of permanent magnets interacts between a drive disc and a driven disc to transmit selected power in infinitely variable ratios from the drive disc to the driven disc. Control means operatively connected between the drive disc and the driven disc position the discs to vary the amount of magnetic flux coupled between the discs, thereby infinitely varying the transmitted power and the speed differential between the input and the output of the transmission. The magnetic flux may be selectively coupled from the driven disc to a stationary brake means to restrict movement of the driven disc and to absorb energy from the output of the transmission.

10 Claims, 9 Drawing Figures

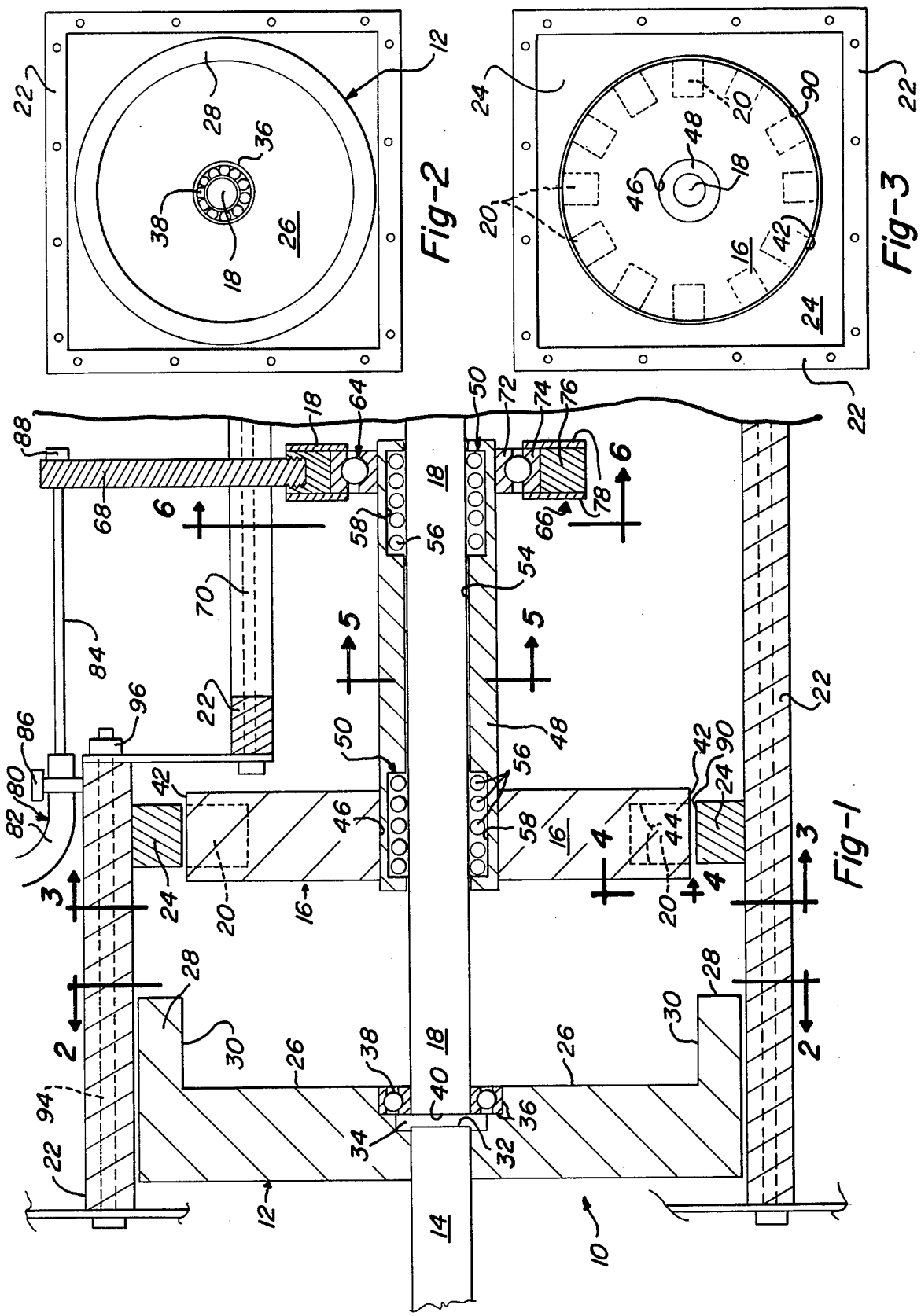

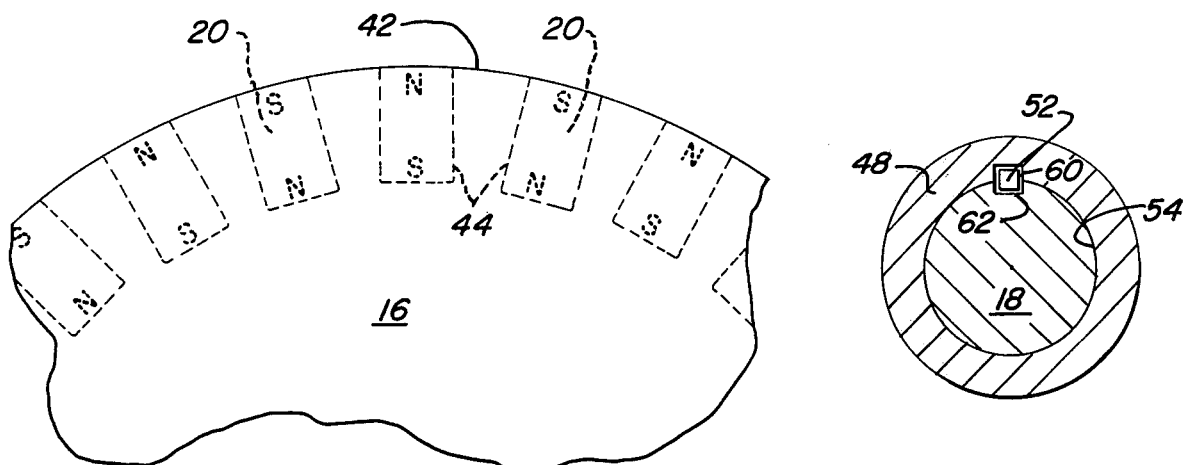
Fig-4
Fig-5
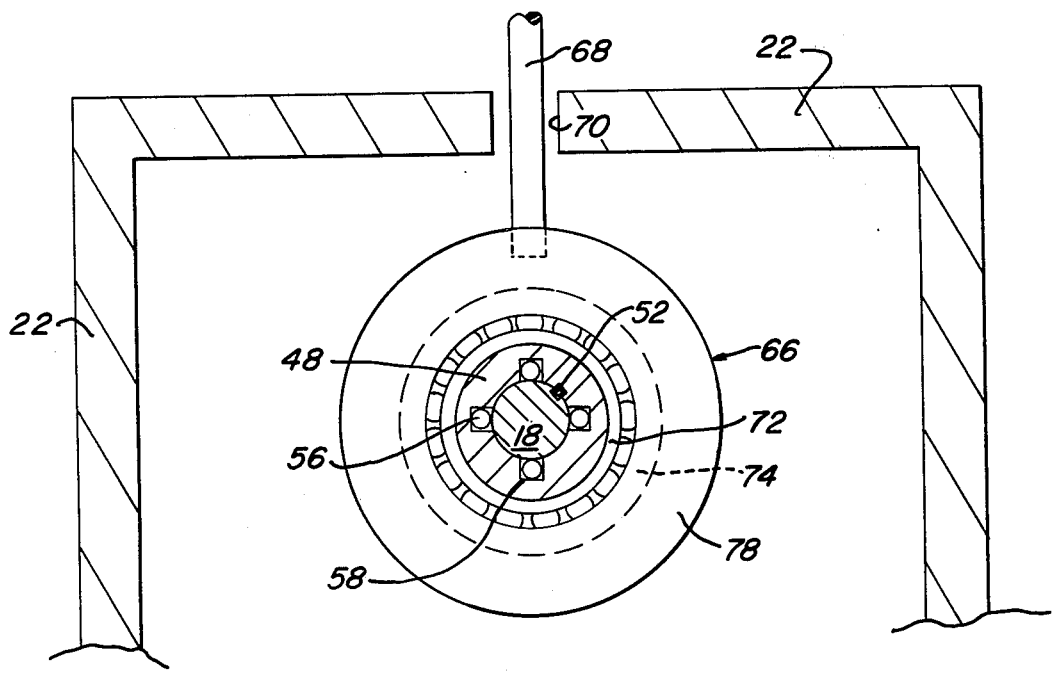
Fig-6

INFINITELY VARIABLE RATIO PERMANENT MAGNET TRANSMISSION

BACKGROUND OF THE INVENTION

1. Field of the Invention

This invention relates to infinitely variable ratio transmission apparatus, and more particularly to such apparatus employing permanent magnets for transmitting energy and varying the amount of energy transmitted. It is contemplated that the present invention is of particular utility in personal passenger transportation vehicles having energy accumulating flywheels for supplying certain portions of the energy for propelling the vehicle, although its applicability is not intended to be absolutely limited in this manner.

2. Brief Description of the Prior Art

As is known in the art, infinitely variable ratio transmissions are utilized to transfer variable energy or torque without regard to the speed of rotation of the input and output elements and to effectively separate the input from the output in an infinite number of torque or power transmitting ratios. In general infinitely variable ratio transmissions are utilized where the input speeds vary greatly with respect to the output speeds. Typical examples of infinitely variable ratio transmissions are motor-generator units, variable capacity fluid drive or pumping systems, and variable diameter sheaves in pulley belt drive systems. The latter belt drive system, however, is not strictly an infinitely variable ratio arrangement, since the ratios are limited by the finite diameter of the variable sheaves.

Infinitely variable ratio transmissions have been utilized in various types of vehicles, although each type of transmission involves certain limitations when used. Motor generator units of sufficient power and energy transmitting capability for transportation vehicles are very expensive, of relatively large size and are generally very heavy. The motor-generator unit has very good variable torque transmitting characteristics, and for this reason is usually utilized in high power situations where weight, size and expense are not critical, such as in railway locomotives. However, to utilize a motor-generator unit in a personal passenger vehicle is prohibitive because of the size, weight and expense of the motor-generator unit. The size of the motor-generator unit increases the size of the vehicle or decreases the space available for use in the vehicle. Fuel is consumed just in propelling the relatively heavy motor-generator unit, which significantly decreases transportation economy.

Variable capacity fluid drive transmission systems, such as hydrostatic transmissions, have relatively good power handling capabilities. Hydrostatic transmissions employ relatively complicated variable capacity pumps and hydraulic motors which tend toward increasing their cost. Further, the efficiency of hydrostatic transmissions is typically poor and these transmissions usually operate at high noise levels.

Variable sheave pulley belt systems have limited power handling capability due to the structural strength of the belts and the apparatus controlling the diameter of the variable sheave. In general, the variable sheave pulley belt systems are not as versatile as true infinitely variable ratio transmission, since the ratio of the belt system is limited by the finite diameter of the pulleys. To overcome this, it is typical that a plurality of variable sheave pulley belt systems are operatively connected together to achieve an extended range of variable ratios or steps. This arrangement however, additionally requires the use of a clutch for most typical situations. When a plurality of such systems are utilized together they consume a relatively large amount of space, the control means linking each unit together may become relatively complex, and the time to effect significant changes in ratios is usually very long.

When utilized in a personal passenger transportation vehicle the infinitely variable ratio transmission should obtain certain requirements. The transmission should be relatively small and light in weight to avoid consuming excessive space and detracting from economy of vehicle operation. The transmission should be relatively dependable in operation and provide a long lifetime of use. The transmission should be as efficient as possible in transferring the highest proportion of input energy to its output, and should have a relatively high energy transmitting or power handling capability to propel an average sized passenger vehicle. The transmission should also have the capability of absorbing energy supplied from the vehicle, such as during braking or stopping thus acting as a fail-safe vehicle brake. Since it is possible with true infinitely variable ratio transmission to avoid use of a clutch, the transmission should be of a configuration which advantageously and inherently provides the function of a clutch. When an engine and energy accumulating flywheel are utilized as a vehicle power plant an infinitely variable ratio transmission is usually required for delivering energy from the flywheel to propel the vehicle, since the flywheel will typically decrease in rotational speed as energy is supplied to the driving mechanism of the vehicle. The infinitely variable ratio transmission can increase the speed of its output shaft as its input shaft slows down, thus allowing the vehicle speed to be advantageously increased or controlled independently of the flywheel speed.

A problem concerning dynamic braking is also present in vehicles utilizing energy accumulating flywheels. In a situation where the flywheel has accumulated maximum energy and is rotating at approximately its maximum safe speed, slowing the vehicle could add energy to the flywheel by increasing its rotational speed. The increased rotational speed may cause the flywheel to shatter or disintegrate with potentially dangerous results. To overcome this situation with a typical infinitely variable ratio transmission requires governors and auxiliary brakes on the flywheel or a sophisticated tachometer control to bypass the energy from the flywheel, all of which are relatively expensive.

A fuller appreciation for the use of the present invention is a vehicle propelled by an engine and flywheel energy accumulator, and the requirements of an infinitely variable ratio transmission in a vehicle can be obtained from Low Energy Consumption Vehicle Powered by Thermal Engine, Ser. No. 786,547, and Flywheel Energy Accumulator, Ser. No. 786,544, filed on the filing date herein by the same inventor.

Many of the foregoing requirements and limitations have applicability in situations where the transmission apparatus is not used with a vehicle. For example eddy current drives are sometimes utilized in a variety of torque transmitting applications. Eddy current drives are usually complicated since electrical coils and electrical conducting circuits are involved. Eddy current drives also require a source of electricity for operation. It should be appreciated that the present invention may be advantageously used as an alternative to known transmission apparatus where the application involves many of the previously discussed requirements and limitations.

SUMMARY OF THE INVENTION

In accordance with the present invention, there is provided an improved infinitely variable ratio transmission which overcomes many of the problems and limitations of the prior art.

Generally summarized, the ininitely variable ratio transmission of the present invention comprises drive disc means operatively connected to a power input for rotation when power is applied to power input, driven disc means for supplying power to a power output when rotated, and permanent magnet means positioned at the disc means for producing magnetic flux to couple between the drive and driven disc means in a preselected manner to vary the magnetic interaction force and thereby vary the amount of force supplied to the driven disc means and at the power output. In addition, control means selectively varies the predetermined quantity of magnetic flux between the drive and driven disc means provide an infinitely variable ratio of power and speed transmitted by the apparatus. A braking means selectively interacts with the magnetic flux of the driven disc means to absorb energy that may be coupled back through the power output to the driven disc means. A method of restricting movement of the driven disc means involves coupling the magnetic flux between the driven disc means and the braking means.

The infinitely variable ratio transmission of the present invention can be constructed relatively small in size, light in weight and low in cost, making the present invention advantageously suited for application in passenger transportation vehicles. The braking means restrains movement at the power output and may be used to brake or slow a vehicle. Furthermore, a relatively rapid and noiseless control of transmission ratio is achieved by changing or moving the position relationship of the drive disc means and the driven disc means which are interconnected by magnetic flux.

A more complete understanding of the present invention and its objectives and advantages may be obtained from the following brief description of the drawings, description of a preferred embodiment of the invention, and the appended claims.

BRIEF DESCRIPTION OF THE DRAWINGS

FIG. 1 is a vertical section view of apparatus comprising a preferred embodiment of the present invention.

FIG. 2 is a section view of reduced size taken substantially along the plane of line 2—2 in FIG. 1.

FIG. 3 is a section view of reduced size taken substantially along the plane of line 3—3 in FIG. 1.

FIG. 4 is an enlarged view taken substantially in the plane of lines 4—4 in FIG. 1.

FIG. 5 is an enlarged section view taken substantially in the plane of line 5—5 in FIG. 1.

FIG. 6 is a section view taken substantially in the plane of line 6—6 in FIG. 1.

DESCRIPTION OF PREFERRED EMBODIMENT

Figure 9:
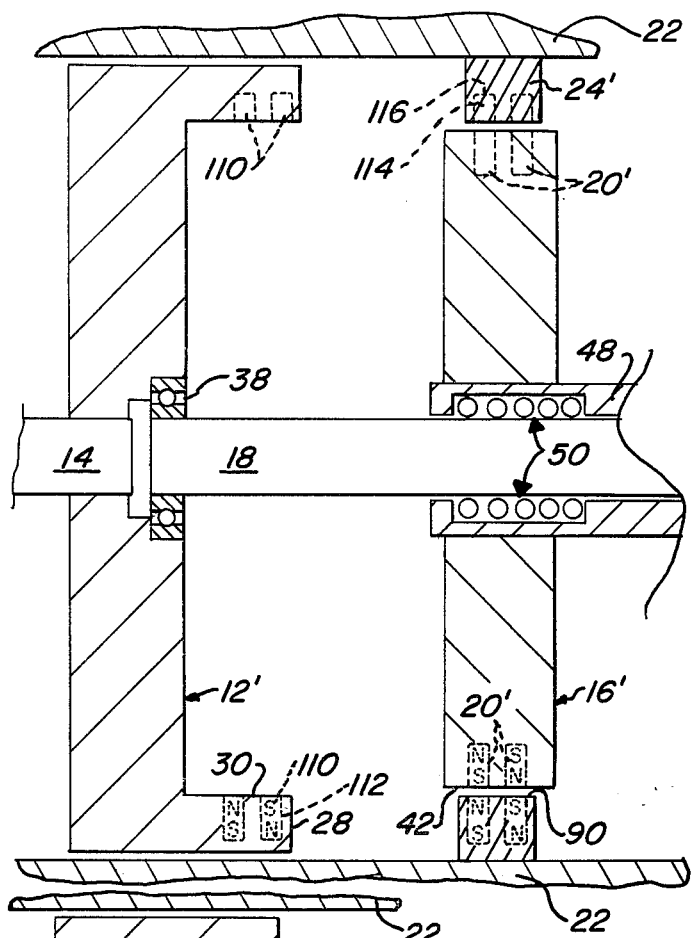
FIG. 9 is a fragmentary view partially similar to FIG. 1 illustrating an alternative arrangement of certain elements of the present invention and also illustrating another condition of operation of the present invention.

The infinitely variable ratio transmission apparatus 10 of the present invention can be generally understood from the drawings and seen from FIG. 1 to comprise a drive disc member or rotor 12 connected to rotate a power input shaft 14, and a driven disc member or spider 16 connected to rotate a power output shaft 18. A plurality of permament magnets 20 are positioned at the outer periphery of the spider 16 to create magnetic flux extending generally radially outward from the spider. Control means operatively moves the spider 16 axially along a portion of the shaft 18 to selectively vary the axial displacement between the rotor 12 and spider 16. A case 22 serves as means for housing and receiving the elements of the infinitely variable ratio transmission 10, including a brake block 24 positioned concentrically with the spider.

In general, when the control means positions the spider 16 adjacent the rotor 12 (to the left in FIG. 1), the magnetic flux from the permanent magnets 20 interacts with the rotor 12 and creates an attractive force between the rotor and spider. The amount of magnetic interaction force is selectively variable according to the axial displacement between the rotor and spider, thus allowing a controllable portion of the power present at the rotating rotor 12 to be coupled to the spider 16 and to the output shaft 18. Should it be desired to apply braking or restraining force to the output shaft 18 to absorb energy or rotation present at the output, the spider 16 is axially positioned at its maximum displacement from the rotor and radially adjacent the brake block 24 (the position shown in FIG. 1,) where the magnetic flux from the permanent magnets 20 causes an interaction force with the brake block 24 to retard rotation of the spider 16 and shaft 18.

The drive disc member or rotor 12, shown in FIGS. 1 and 2, is circular and comprises a radially extending disc portion 26 and a flange portion 28 annularly formed to the disc portion 26. The flange portion 28 extends axially from the disc portion 26 to define an inner axially extending surface 30. The power input shaft 14 is rigidly attached to the rotor 12, and conventional support means (not shown) operatively position the rotor 12 and shaft 14 for rotation in an axially stationary position within the case 22. An end 32 of the shaft 14 terminates at a center chamber 34 formed in the rotor 12. A receptacle 36, formed coaxially in the rotor 12 about its axis of rotation, receives and retains a conventional roller bearing 38. The bearing 38 supports an end 40 of shaft 18 at rotor 12 against radial movement with respect to the axes of rotation of the rotor 12 and shaft 14. The shaft ends 32 and 40 are axially separated and the roller bearing 38 also allows the power input and power output shafts to rotate independently of one another.

The driven disc member or spider 16, shown in FIGS. 1, 3 and 4, has an outside circular surface 42 with apertures 44 formed radially inward from surface 42 for receiving the permanent magnets 20. A center opening 46 coaxial with the axis of rotation of the spider 16 receives a sleeve member 48, and the spider 16 is rigidly attached to the sleeve member 48 in a conventional manner.

The number of permanent magnets 20 utilized relates to the predetermined maximum force and energy to be transferred through the transmission 10. The permanent magnets 20 are attached within the apertures 44 of the spider in a conventional manner. The permanent magnets 20 are positioned in the apertures 44 with the magnetic poles of adjacent magnets around the outside circular surface 42 being of alternating polarity with respect to one another, as is shown in FIG. 4.

To operatively connect the spider 16 for rotation with the power output shaft 18 and to axially move the spider 16 along a portion of the shaft 18 there is provided the sleeve member 48, a plurality of linear bearings 50 for supporting the sleeve member 48 for axial movement along the shaft 18, and a key 52 for preventing relative rotation between the sleeve member 48 and the shaft 18, as in FIGS. 1, 5 and 6. An opening 54 extends coaxially through the sleeve member 48 for receiving the center shaft 18. Each linear bearing 50 is comprised of a plurality of roller members such as balls 56 received within axially extending slots 58 formed radially outward from the surface 54 of the sleeve member 48. Supported by the linear bearings 50, the sleeve member 48 will readily move axially along the shaft 18. The key 52 is partially received within a keyway portion 60 formed from the outside surface of the shaft 18. The keyway portions 60 and 62 extend in a mating relationship parallel to the axis of rotation of shaft 18. The key 52 extends into both keyway portions 60 and 62 to prevent rotation of the sleeve member 48 relative to the shaft 18.

To control the axial movement of the sleeve member 48 and axial separation of the spider 16 with respect to the rotor 12 and brake block 24, a roller bearing 64 and a bearing support assembly 66 are operatively attached to the sleeve member 48. A control lever extends from the support assembly 66 through a slot 70 formed in the case 22 to the exterior of the transmission 10, as seen in FIGS. 1 and 6. An inner race 72 of the roller bearing 64 is rigidly attached to the sleeve member 48 in a conventional manner and an outer race 74 of the roller bearing 64 is operatively attached to the bearing support assembly 66 by an outer annular support member 76 and side plates 78 attached to prevent axial movement of the race 74 relative to the support member 76. The roller members or balls of the bearing 64 prevent relative axial movement between races 72 and 74. The control lever 68 is threaded or otherwise attached to the support member 76. A control cable 80 comprising an outer hollow housing 82 and an inner flexible control rod 84 controls operation of the transmission 10. The cable housing 82 is anchored by conventional means 86 to the case 22, and the flexible control rod 84 is attached to the control lever 68 by conventional means 88. Movement of the control rod 84 is transferred through elements 68, 66, and 48 to operatively position the spider 16 axially along shaft 18. A spring means (not shown) biases the elements to position the spider 16 radially adjacent the brake block 24 (shown in FIG. 1).

The brake block 24 shown in FIGS. 1 and 3, is attached in a conventional manner to the interior of case 22. The brake block 24 includes a circular opening 90 concentric with the outside surface 42 of the spider 16, and the opening 90 is of slightly larger diameter than the diameter of surface 42.

The case 22 is formed from a plurality of conventional elements attached together by fasteners such as blots 94 and nuts 96.

In the rotor 12, the flange portion 28 is formed of magnetic material with which the flux from the permanent magnets 20 interacts to create a force therebetween. The disc portion 26 of the rotor is formed of non-magnetic material. The brake block 24 is formed of magnetic material with which the flux from the permanent magnets 20 interacts to create a force therebetween. The spider 16 is constructed of non-magnetic material such as aluminum which will not interfer or otherwise affect the magnetic flux from the permanent magnet 20. The permanent magnets are of the ceramic or rare earth type having a very high Oerstead (H) characteristic to avoid demagnetization over extended periods of use in air gaps. The material of case 22 should preferably have good heat conducting capability since the energy absorbed during braking is converted into heat and this heat should be rapidly conducted by the case 22 to the ambient environment.

Figure 8:
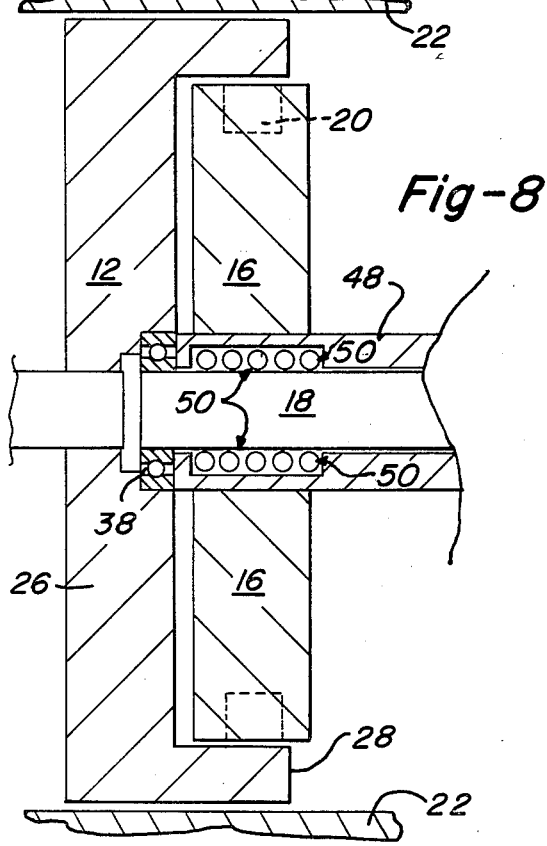
FIG. 8 is a view of a fragmentary portion of FIG. 1 illustrating one condition of operation of the present invention.
Figure 7:
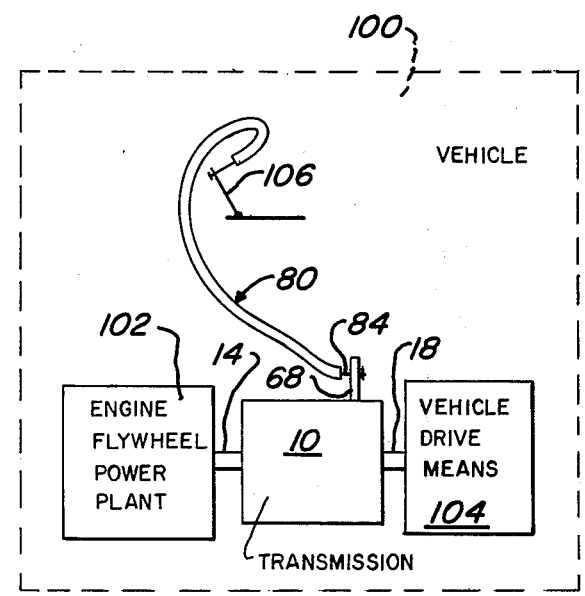
FIG. 7 is a schematic view of the apparatus of the present invention utilized in a vehicle powered by an engine and flywheel power plant.

One use of the transmission 10 for conducting variable ratios of input rotational power to output rotational power is shown in FIG. 7. The infinitely variable ratio transmission 10 is employed in a vehicle 100. The input shaft 14 of the transmission 10 is connected to an engine and flywheel power plant 102 and the output shaft 18 of the transmission 10 is operatively connected to a vehicle drive means 104 which may take the form of a conventional rear axle and differential. The control lever 68 is operatively connected by the rod 84 of the control cable 80 to an accelerator control or pedal 106 accessible for use by the operator of the vehicle. When it is desired to couple energy from the power plant 102 to the drive means 104, the accelerator pedal 106 is moved and the control lever 68 causes the control means associated with the spider 16 to axially move the spider 16 until the magnetic flux from the permanent magnets 20 extends to the flange 28 in between the surfaces 30 and 42 to create an interaction force and rotate the spider 16 and output shaft 18. With increasing axial movement of the spider 16 toward the rotor 12 (more depression of pedal 106) more magnetic flux is coupled from the magnets 20 to the surface 30 of the flange portion 28 causing greater transmission of force through the transmission 10. At the maximum axially displaced position illustrated in FIG. 8, maximum force is coupled between the rotor and spider. During operation, the speed of the output shaft is related to the speed of the input shaft by the amount of magnetic flux and hence force between the permanent magnets 20 to the flange portion 28. Consequently the rotational speed of the rotor 12 and spider 16 are variable according to the axial position of the spider as determined by the control means which is operative to selectively vary the magnetic flux coupled between the rotor and spider.

To supply a retarding or braking force on the output shaft 18, the spider is returned to the position shown in FIG. 1 with the magnets 20 of the spider 16 radially adjacent the brake block 24. In this position, the magnetic flux from magnets 20 is coupled to the brake block 24, and the interaction force between surfaces 42 and 90 creates heat in the brake block 24 as the output shaft 18 rotates. In this manner energy is absorbed and a braking function is achieved.

To allow the power output shaft 18 to rotate freely without affect from either the rotor 12 of the brake block 24, the spider 16 is positioned axially intermediate the flange 28 and the brake block 24. In this position the magnetic force from the magnets 20 is not readily conducted to either the flange 28 or the brake block 24, thereby allowing the power output shaft 12 to rotate relatively freely.

It is thus apparent that an infinite number of ratios or separate outputs are provided from the transmission 10. As more magnetic flux is operatively coupled between the spider and the rotor, the speed of the output shaft increases toward the speed of the rotor. As the spider is axially withdrawn from radial adjacency with the flange 28 of the rotor to decrease the magnetic flux coupled therebetween, the speed of the output shaft decreases with respect to the speed of the power input shaft. It is also possible that the speed of the output shaft will increase while the speed of the input shaft increases or vice versa, as a result of the selective control available with the transmission 10.

An alternative arrangement for coupling magnetic flux between the spider and rotor and between the spider and brake block is illustrated in FIG. 9. A plurality of permanent magnets 110 are received within apertures 112 formed radially outward from the surface 30 of the rotor flange 28. The magnets 110 may form a plurality of axially separated annular rings with the magnets in each ring being equally circumferentially spaced. The magnetic pole of each magnet 110 at the surface 30 is of opposite polarity with respect to the magnetic poles of the surrounding magnets 110 next adjacent that particular magnet at the surface 30.

A plurality of equally circumferentially spaced permanent magnets 114 in axially separated annular rings are positioned within apertures 116 formed radially outward from the surface 90 in the brake block 24'. The magnetic pole of each magnet 114 at the surface 90 is of opposite polarity with respect to the magnetic poles of the surrounding magnets 114 next adjacent that particular magnet at the surface 90. The spider 16' is likewise formed with a plurality of equally circumferentially spaced magnets 20' received within apertures 44' in a number of axially separated annular rings. The magnetic pole of each magnet 20' at the surface 42 is of opposite polarity with respect to the magnetic poles of the surrounding magnets 20' next adjacent that particular magnet at the surface 42. In this embodiment, the materials of the rotor 12', the spider 16' and the brake block 24' are nonmagnetic.

From this description it should be apparent that a functionally effective infinitely variable ratio transmission is achieved. The transmission can be readily and economically constructed to be small in size and light in weight. Varying the ratio of the transmission is accomplished quickly and with relative ease. The power transmitting capability of the transmission is limited by the number and strength of the permanent magnets and the spaces of the magnetic air gap. Transmission operation is self-sufficient since no external sources are needed to create the magnetic flux. The transmission further supplies a selective braking function or retarding action at its output which is highly advantageous in certain applications such as in propelling vehicles.

Preferred embodiments of the present invention have been described with a degree of specificity to enable a relatively full and complete understanding of those embodiments. It should be understood however that the present invention is defined by the following claims which are intended to encompass a scope of invention to the extent that the prior art allows.

What is claimed is:

1. An infinitely variable ratio power transmission and brake assembly, comprising:

power input means;

drive disc means operatively connected to said power input means for rotation about an axis of rotation and for rotation when power is supplied to said power input means;

driven disc means operatively connected in spaced apart and non-contacting relation with said drive disc means for rotation about the axis of rotation;

power output means operatively connected to rotate with said driven disc means when said driven disc means is rotated;

magnetic braking means positioned in spaced apart and non-contacting relation with respect to both said disc means;

permanent magnet means, positioned on at least one of said disc means or said braking means, for producing magnetic flux adapted to be selectively coupled through the space between said drive and driven disc means and through the space between said driven disc means and said braking means to create a predetermined driving interaction force between said drive and driven disc means and to create a predetermined restraining interaction force between said driven disc means and said braking means, respectively; and control means, operatively associated with said drive disc means and driven disc means and said braking means, for selectively varying the predetermined quantity of magnetic flux coupled between said drive and driven disc means and for varying the predetermined quantity of magnetic flux coupled between said driven disc means and said braking means.

2. An infinitely variable ratio power transmission and break assembly as recited in claim 1 further comprising, in combination:

a personal transportation vehicle having a power plant and vehicle drive means, means for connecting said power input means to the power plant of said vehicle, and means for connecting said power output means to the vehicle drive means of said vehicle.

3. The invention as recited in claim 2 wherein the power plant of said vehicle comprises an engine and energy accumulating flywheel.

4. An infinitely variable ratio power transmission and brake assembly, as recited in claim 1 wherein:

said drive disc means comprises a rotor positioned for rotation in an axially stationary position, said driven disc means comprises a spider comprised essentially of non-magnetic material, and said permanent magnet means comprises a plurality of permanent magnets positioned on said spider.

5. An infinitely variable ratio power transmission and brake assembly as recited in claim 4 wherein:

said braking means comprises a brake block member positioned in an axially stationary position and comprised essentially of magnetic material;

said spider is operatively connected to said power output means for axial movement relative to said rotor and said brake block member; and said control means is operatively connected with said spider for positioning said spider axially with respect to said rotor and said brake block member for selectively varying the predetermined quantity of magnetic flux coupled from the permanent magnets to said rotor member and said brake block.

6. An infinitely variable ratio power transmission and brake assembly as recited in claim 5 wherein:
said spider has an outer circular surface concentric with the axis of rotation;
said plurality of permanent magnets are equally circumferentially spaced around the outer circular surface of said spider;
said rotor comprises an annular flange of magnetic material extending axially toward said spider, said flange having an inner surface concentric with the axis of rotation and a diameter larger than the diameter of the outer circular surface of said spider,
said brake block member comprises a circular opening having an inner surface concentric with the axis of rotation, the diameter of the inner surface being larger than the diameter of the outer surface of said spider, said brake block member being positioned in an axially spaced relation from the flange of said rotor; and
said control means positions said spider with the outer circular surface thereof circumjacent the inner surface of the flange of said rotor and positions said spider with the outer circular surface thereof circumjacent the inner surface of the circular opening in said brake block member.

7. An infinitely variable ratio power transmission and brake assembly as recited in claim 6 wherein:
said plurality of permanent magnets first aforementioned are equally circumferentially spaced about the outer circular surface of said spider member,
said rotor comprises a second plurality of permanent magnets positioned at the flange in an equally circumferentially spaced relationship, and
said brake block member comprises a third plurality of permanent magnets positioned in equally circumferentially spaced relationship around the circular opening.

8. An infinitely variable ratio power transmission and brake assembly as recited in claim 1, wherein:
said driven disc means is moveable in relation to both said drive disc means and said braking means whereby to vary the space between said driven and drive disc means and between said driven and braking means; and
said control means is operatively connected to move said driven disc means to selectively vary the space between said drive and driven disc means and between said driven disc and braking means.

9. A method of restricting movement of a vehicle utilizing vehicle drive means for propelling said vehicle, comprising the steps of:
providing a driven member,
connecting the driven member with the vehicle drive means,
providing a brake member,
positioning the brake member adjacent the driven member,
rotating the driven member during propelling of the vehicle,
holding the brake member stationary with respect to the rotating driven member during propelling of the vehicle,
creating magnetic flux, and
selectively coupling the magnetic flux between the driven member and the brake member.

10. A method as recited in claim 9 further comprising the step of:
controlling the quantity of magnetic flux coupled between the driven member and the brake member.

* * * * *